Patented July 9, 1935

2,007,721

UNITED STATES PATENT OFFICE 2,007,721

INSECTICIDES AND THE LIKE

Frank Floyd Lindstaedt, Oakland, Calif., assignor to Hercules Glue Company, San Francisco, Calif., a corporation of California No Drawing. Refile of abandoned application Serial No. 281,372, May 28, 1928. This application May 17, 1930, Serial No. 453,416

29 Claims. (Cl. 167—34)

This is a refile of abandoned application Serial Number 281,372 of May 28, 1928.

My invention relates to toxic substances and particularly to such substances as are intended for use as insecticides, ovacides, larvicides, and for the destruction of pests. Although intended primarily for external application, as for example in the form of a spray upon substances exposed to the air, as vegetation, it may nevertheless be employed in certain instances internally, as for example, when employed in the treatment of worms, or like parasites in the digestive tract.

The advantages of nicotine and like alkaloidal derivatives of tobacco or synthetic volatile alkaloids for such uses as above explained have long been recognized. These alkaloids, of which nicotine is the major derivative, are, unfortunately, quite volatile. Nicotine sulphate, which is the form commonly employed for the application of nicotine in the form of a spray, loses its effectiveness in a few hours when exposed to the atmosphere, and while it is effective by reason of its volatility during this period, it has no further effect thereafter.

One of the chief objects of my invention, therefore, is to produce a new chemical compound of a volatile alkaloid or alkaloids, which will retard the liberation of the volatiles, such as nicotine, so that they remain effective for considerable periods, increasing the effectiveness of nicotine whenever it may be employed, as a spray, for example, and making possible its internal administration.

Another object of my invention is to produce a nicotine compound for such purposes as are indicated above, and analogous uses, from which the nicotine may be slowly liberated, to act as much by contact and ingestion to kill pests, as by suffocation, previous nicotine compounds having acted largely by suffocation.

Further objects of my invention are to produce a compound for such purposes as are indicated above and analogous uses, which may be employed as a spray and spreader therefore combined, which can readily be manufactured; and which is relatively inexpensive.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Investigations conducted by myself have shown that a chemical compound can be formed by the addition of alginic acid to a solution of nicotine alkaloid. Alginic acid is insoluble in water. I have found also that the same reaction may be obtained with abietic acid. When molecular proportions of alginic acid and nicotine alkaloid are brought together in the presence of water a thick jelly or viscous solution (colloidal dispersion) of nicotine alginate is formed. Nicotine alginate is the most stable compound of nicotine I know of or have been able to produce. It is certain that this new compound which I call nicotine alginate does not free its nicotine rapidly, but continues to give off nicotine for many times the length of time required to exhaust known nicotine compounds of their nicotine. This conserves the nicotine and gives it off, to act by suffocation, in less, yet effective quantities. The compound of my invention has other advantages. Thus it insures that there will be present, in sufficient quantities and over long periods of time, nicotine which will irritate pests by contact, causing them to drop off from the protected surfaces, and which, if eaten by the pests will cause their death. Thus nicotine alginate is effective in three ways, and over long periods of time.

While nicotine alginate does not act as spreader to the same degree as nicotine caseinate, the unusual stability of nicotine alginate makes its employment as a contact, irritating, and ingestional insecticide highly desirable. In practice I have found it advisable to have some free nicotine present over and above that actually combined with as nicotine alginate.

The reason for adding some free nicotine to the compound nicotine alginate is to provide nicotine that will volatilize readily when the same is used as a spray so that many of the parasites will be killed by suffocation, while the more stable nicotine alginate will remain on the sprayed surfaces to act as a repellent, contact poison, irritant and parasiticide by ingestion.

In the commercial preparation of my parasiticide so as to provide a composition containing some free nicotine alkaloid for the purposes described, I prefer to use about the following proportions. To 100 pounds of a water-jell of alginic acid (also termed fibrous alginic acid—see Patent 1,814,981) containing about 12 percent of absolute alginic acid, I add 50 pounds of 40 percent nicotine alkaloid. The resulting mixture is then agitated until a clear viscous solution or dispersion is obtained.

For use as an insecticidal or a parasiticidal spray, 1 to 3 pounds of the described nicotine—nicotine alginate composition may be used with 100 gallons of spray water. If it is desired to enhance the spreading properties of the resultant spray composition, a suitable spreader in suitable proportions may be dispersed therewith. Sodium caseinate or a neutral soap may be employed for this purpose.

If it is desired to produce nicotine alginate, containing no or very little free nicotine alkaloid, the quantities of nicotine alkaloid and alginic acid may be so chosen as to provide a substantially neutral reaction product; or if it is desired to produce a solution or dispersion of greater concentration than that described, nicotine alkaloid of 95 percent concentration may be used with alginic acid of lower water content. When a dried product of nicotine alginate is desired, naturally the more concentrated raw ingredients (also termed "spray dried alginic acid"—see Patent 1,814,986) should be used, and the product finally dried by any suitable means, such as in a film or mist type of dryer.

In place of nicotine alkaloid, any other volatile alkaloid such as coniine may be employed. Volatile alkaloids are a clearly recognized class of alkaloids including nicotine and coniine—see Allen's Commercial Organic Analysis (copyright 1912) volume 6, page 207—and the term nicotine alkaloid is used as including such other alkaloids, particularly synthetic nicotine.

As previously explained a reaction product of nicotine alkaloid and abietic acid may be also obtained in a manner similar to that described. However, I have found that although similar reactions may be obtained with nicotine and alginic or abietic acid, the compound formed with alginic acid is more stable and efficacious for the purpose of allowing a very slow liberation of the nicotine.

The final substance, prepared in the manner stated or in a manner not deviating from the spirit of the invention, may be used as a spray upon vegetation, or in other places where it is desired to destroy insects, grubs, parasites or the eggs thereof. It may be supplied for such purposes in concentrated liquid form, ready to mix with large quantities of water. Thus applied the nicotine alginate slowly decomposes, the nicotine being freed, and apparently the alginic acid remaining. The nicotine is slowly given off and remains in association with the thing which has been sprayed, over long periods, whereas nicotine disappears from known nicotine compounds, as nicotine sulphate, in a few hours, more or less, depending upon temperature and humidity conditions. Under the same conditions nicotine can be detected in toxic quantities on the articles sprayed with the nicotine alginate for a period of eight to fourteen days or longer.

This is a decided advantage in many ways. For the orchardist, for example, who sprays his trees for insects or pests, the first application will perhaps kill or drive away the pests, but if the nicotine disappears after a few hours, a change in the wind, or improvement in reproducing conditions may cause reinfestation, and the spraying must be repeated.

Where the effect persists for long periods, as for a week or longer, it is not necessary to watch over the orchard so closely. Furthermore, should the pests deposit their eggs before being driven off or killed by the first spray, the eggs themselves will be destroyed by osmosis; that is to say, all life within them will be destroyed by the intimate association with, and permeation by the nicotine; or the grubs on hatching, will eat the nicotine and be killed. Not only will this reduce the cost of spraying, but it will reduce the labor attendant upon keeping close watch over the orchard, and upon frequent repetition of the spraying process.

It will be noted above that it was said to be preferable that an excess of nicotine alkaloid be employed in the formation of the compound. As previously explained, this is for the purpose of having an excess of nicotine not combined as alginate, which when the spray is first applied is available quickly, so that the material sprayed is provided with the protection of nicotine vapors from the instant the spray strikes. This effect quickly disappears, but when this occurs, the decomposition of the nicotine alginate has begun and persists over a long period.

The term "alkaloid" includes usually, as used in the literature, nitrogenous basic compounds present in plants or derived from various plant tissues by distillation. As used herein, it also includes synthetic materials similar in character to those derived from plants and plant tissue.

I claim:

1. A new composition of matter for use as an insecticide, ovicide, and parasiticide comprising alginic acid having added thereto nicotine alkaloid in quantity greater than that sufficient to satisfy the valance of the alginic acid.

2. A composition of matter for use as an insecticide, ovicide and parasiticide comprising a compound resulting from the combination of alginic acid and nicotine alkaloid.

3. As an article of manufacture, the chemical compound of addition resulting from the chemical reaction between alginic acid and an alkaloid.

4. As an article of manufacture, a chemical compound of addition resulting from the chemical reaction between alginic acid and nicotine alkaloid.

5. As an article of manufacture, the chemical compound of addition resulting from the chemical reaction between alginic acid and a volatile alkaloid.

6. The method of preparing alginic acid compounds which includes the step of adding to alginic acid an alkaloid.

7. The method of preparing alginic acid compounds which includes the step of adding to alginic acid an alkaloid in an amount sufficient to neutralize substantially said acid.

8. The method of preparing alginic acid compounds which includes the step of adding to alginic acid an alkaloid in an amount more than sufficient to neutralize said acid so that the final product contains free alkaloid.

9. The method of preparing alginic acid compounds which includes the step of adding to alginic acid nicotine alkaloid.

10. The method of preparing alginic acid compounds which includes the step of adding to alginic acid nicotine alkaloid in an amount sufficient to neutralize substantially said acid.

11. The method of preparing alginic acid compounds which includes the step of adding to alginic acid nicotine alkaloid in an amount more than sufficient to neutralize said acid so that the final product contains free nicotine.

12. The method of producing nicotine alginate consisting in adding nicotine alkaloid to alginic acid.

13. The method of producing nicotine alginate consisting in adding nicotine alkaloid to alginic acid in the proportion of about twelve pounds of alginic acid to twenty pounds of nicotine.

14. As an article of manufacture; the chemical compound of addition resulting from the neutralization of fibrous alginic acid with nicotine alkaloid.

15. As an article of manufacture; the chemical compound of addition resulting from the chemical reaction between spray dried alginic acid and nicotine alkaloid.

16. The herein described method of producing nicotine alginate consisting in gradually adding to spray dried alginic acid nicotine alkaloid.

17. As an article of manufacture; the chemical compound of addition resulting from the neutralization of fibrous alginic acid and an alkaloid.

18. As an article of manufacture; the chemical compound of addition resulting from the neutralization of spray dried alginic acid and an alkaloid.

19. Anhydrous nicotine alginate.

20. The anhydrous reaction product of alginic acid and an alkaloid.

21. The method of preparing anhydrous nicotin alginate comprising reacting in the presence of water alginic acid and nicotine to form nicotine alginate and then dehydrating said nicotine alginate.

22. The method of preparing an anhydrous reaction product of alginic acid and alkaloid comprising reacting said alkaloid and said acid in the presence of water to form a reaction product and then dehydrating said product.

23. The addition product of alginic acid and coniine.

24. Anhydrous coniine alginate.

25. Coniine alginate containing free coniine.

26. The addition product of alginic acid and an alkaloid having in its structural formula a pyridine ring.

27. Neutral nicotine alginate.

28. Neutral coniine alginate.

29. Basic nicotine alginate.

FRANK FLOYD LINDSTAEDT.